US009754130B2

(12) United States Patent
Trent et al.

(10) Patent No.: US 9,754,130 B2
(45) Date of Patent: Sep. 5, 2017

(54) PEER INTEGRITY CHECKING SYSTEM

(75) Inventors: Barry A. Trent, Chanhassen, MN (US); Edward R. Mandy, Victoria, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 315 days.

(21) Appl. No.: 13/462,000

(22) Filed: May 2, 2012

(65) Prior Publication Data

US 2012/0284794 A1 Nov. 8, 2012

Related U.S. Application Data

(60) Provisional application No. 61/481,586, filed on May 2, 2011.

(51) Int. Cl.
*G06F 11/00* (2006.01)
*G08B 23/00* (2006.01)
*G06F 21/64* (2013.01)
*G06F 21/56* (2013.01)

(52) U.S. Cl.
CPC ............ *G06F 21/64* (2013.01); *G06F 21/568* (2013.01)

(58) Field of Classification Search
CPC ..... G06F 21/6218; G06F 21/64; G06F 21/568
USPC ............... 726/13, 22–25; 713/164, 187–188, 713/193–194; 709/206; 707/9
See application file for complete search history.

(56) References Cited

U.S. PATENT DOCUMENTS

| 5,208,853 A | 5/1993 | Armbruster et al. |
| 5,436,972 A | 7/1995 | Fischer |
| 5,557,346 A | 9/1996 | Lipner et al. |
| 5,557,678 A | 9/1996 | Ganesan |
| 5,623,546 A | 4/1997 | Hardy et al. |
| 5,675,649 A | 10/1997 | Brennan et al. |
| 5,737,419 A | 4/1998 | Ganesan |
| 5,748,735 A | 5/1998 | Ganesan |
| 5,764,772 A | 6/1998 | Kaufman et al. |
| 5,815,573 A | 9/1998 | Johnson et al. |
| 5,838,792 A | 11/1998 | Ganesan |
| 5,870,477 A | 2/1999 | Sasaki et al. |
| 5,920,630 A | 7/1999 | Wertheimer et al. |
| 6,026,163 A | 2/2000 | Micali |
| 6,052,469 A | 4/2000 | Johnson et al. |
| 6,061,794 A | 5/2000 | Angelo et al. |
| 6,118,874 A | 9/2000 | Okamoto et al. |
| 6,182,214 B1 | 1/2001 | Hardjono |
| 6,185,685 B1 | 2/2001 | Morgan et al. |
| 6,246,768 B1 | 6/2001 | Kim |
| 6,359,986 B1 | 3/2002 | Tatebayashi |
| 6,363,154 B1 | 3/2002 | Peyravian et al. |
| 6,411,716 B1 | 6/2002 | Brickell |

(Continued)

OTHER PUBLICATIONS

Iyengar et al., "Design and Implementation of a Secure Distributed Data Repository," 1998, published by Capman & Hall, pp. 123-135.

(Continued)

*Primary Examiner* — Evans Desrosiers

(74) *Attorney, Agent, or Firm* — Shumaker & Sieffert, P.A.

(57) ABSTRACT

A distributed file integrity checking system is described. The described peer integrity checking system (PICS) may negate an attack by storing a properties database amongst nodes of a peer-to-peer network of hosts, some or all of which co-operate to protect and watch over each other.

13 Claims, 3 Drawing Sheets

(56) References Cited

U.S. PATENT DOCUMENTS

| | | |
|---|---|---|
| 6,490,680 B1 | 12/2002 | Scheidt et al. |
| 6,662,299 B1 | 12/2003 | Price, III |
| 6,745,220 B1 | 6/2004 | Hars |
| 7,039,186 B2 | 5/2006 | Ezawa |
| 7,065,579 B2 | 6/2006 | Traversat et al. |
| 7,146,009 B2 | 12/2006 | Andivahis et al. |
| 7,146,501 B2 | 12/2006 | Tanaka |
| 7,181,017 B1 | 2/2007 | Nagel et al. |
| 7,187,772 B2 | 3/2007 | Vora et al. |
| 7,216,359 B2 | 5/2007 | Katz et al. |
| 7,222,231 B2 | 5/2007 | Russell et al. |
| 7,299,498 B2 | 11/2007 | Lee et al. |
| 7,400,732 B2 | 7/2008 | Staddon et al. |
| 7,401,132 B1 | 7/2008 | Krumel et al. |
| 7,509,492 B2 | 3/2009 | Boyen et al. |
| 7,552,125 B1* | 6/2009 | Evans |
| 8,015,211 B2 | 9/2011 | Marceau et al. |
| 2002/0013898 A1 | 1/2002 | Sudia et al. |
| 2002/0078345 A1 | 6/2002 | Sandhu et al. |
| 2002/0141593 A1 | 10/2002 | Kurn et al. |
| 2002/0157016 A1 | 10/2002 | Russell et al. |
| 2003/0026432 A1 | 2/2003 | Woodward |
| 2003/0070070 A1 | 4/2003 | Yeager et al. |
| 2003/0120928 A1 | 6/2003 | Cato et al. |
| 2003/0147536 A1 | 8/2003 | Andivahis et al. |
| 2003/0172280 A1 | 9/2003 | Scheidt et al. |
| 2003/0174840 A1 | 9/2003 | Bogan |
| 2003/0182421 A1 | 9/2003 | Faybishenko et al. |
| 2003/0185398 A1 | 10/2003 | Hypponnen |
| 2003/0233578 A1 | 12/2003 | Dutertre |
| 2004/0019640 A1 | 1/2004 | Bartram et al. |
| 2004/0031038 A1 | 2/2004 | Hugly et al. |
| 2004/0064693 A1 | 4/2004 | Pabla et al. |
| 2004/0088369 A1 | 5/2004 | Yeager et al. |
| 2004/0123104 A1 | 6/2004 | Boyen et al. |
| 2004/0123143 A1 | 6/2004 | Katz et al. |
| 2004/0143666 A1 | 7/2004 | Xu et al. |
| 2004/0153458 A1* | 8/2004 | Noble ............... G06F 11/1464 |
| 2004/0153473 A1* | 8/2004 | Hutchinson et al. ...... 707/104.1 |
| 2004/0181607 A1 | 9/2004 | Xu et al. |
| 2004/0205242 A1 | 10/2004 | Xu et al. |
| 2004/0210624 A1 | 10/2004 | Andrzejak et al. |
| 2005/0108203 A1 | 5/2005 | Tang et al. |
| 2005/0187946 A1 | 8/2005 | Zhang et al. |
| 2005/0240591 A1* | 10/2005 | Marceau et al. ................ 707/9 |
| 2006/0031673 A1* | 2/2006 | Beck ..................... G06F 21/565 |
| | | 713/164 |
| 2006/0248333 A1 | 11/2006 | Sandhu et al. |
| 2009/0010426 A1 | 1/2009 | Redmond |
| 2009/0210697 A1* | 8/2009 | Chen et al. ................. 713/153 |
| 2009/0290714 A1* | 11/2009 | Charles et al. ............. 380/278 |
| 2010/0058054 A1* | 3/2010 | Irvine ................. H04L 63/0407 |
| | | 713/165 |
| 2010/0064354 A1* | 3/2010 | Irvine ................. G06F 21/6218 |
| | | 726/5 |
| 2010/0161752 A1* | 6/2010 | Collet .................... H04L 67/104 |
| | | 709/216 |

OTHER PUBLICATIONS

Balakrishnan et al., "Looking Up Data in P2p Systems," Communications of the ACM, vol. 46, No. 2, Feb. 2003, pp. 43-48.
Dabek, "A cooperative File System," MIT, Master Engineering in Computer Science and Engineering, Sep. 2001, 55 pp.
Tang et al., "Peer-to-Peer Information Retrieval Using Self-Organizing Semantic Overlay Networks," SIGCOMM '03, Karlsrhe, Germany, Aug. 25-29, 2003 pp. 175-186.
Risse et al, "Data Storage Requirements for the Service Oriented Computing," SAINT-w '03, Jan. 27-31, 2003, pp. 67-72.
Hsiao et al., "Tornado: A Capability-Aware Peer-to-Peer Storage Network," IPDPS '03, Apr. 22-26, 2003, 8 pp.
Mislove et al., "POST: A Secure, Resilient, Cooperative Messaging System," Proc. Of the 9$^{th}$ Conf. on Hot Topics in Operating Systems, vol. 9, Lihue, HI, © 2003, 6 pp.
Wallach, "A Survey of Peer-to Peer Security Issues," ISSS 2002, Tokyo, Japan, Nov. 8-10, 2003 pp. 42-57.
Daswani et al., "Open Problems in Data-Sharing Peer-to-Peer Systems," ICDT 2003, Siena, Italy, Jan. 8-10, 2003, 15 pp.
Microsoft Computer Dictionary, 5$^{th}$ Edition, Microsoft Press, Redmond, WA, © 2002, p. 300.
Seitz et al., "Key Management for Encrypted Data Storage in Distributed Systems," IEEE Security in Storage Workshop, © 2003, pp. 20-30.
Bellare et al. "Verifiable Partial Key Escrow," CCS 97, Zurich, Switzerland, © 1997, pp. 78-91.
Jablon, "Password Authentication Using Multiple Servers," CT-RSA 2001, LNCS 2020, Springer-Verlag, Berlin, Germany, © 2001, pp. 344-360.
Stinson D. R., et al., "Key Preassigned Traceability Schemes for Broadcasts Encryption," SAC '98, LNCS 1556, Springer Verlag, Berlin, Germany, © 1999, pp. 144-156.
Wright et al. "NCryptfs: A Secure and Convenient Cryptographic File System," USENIX 2003 Annual Technical Conf., © 2003, 14 pp.
Shamir et al., "How to Share a Secret," Communications of the ACM, vol. 22, Issue 11, Nov. 1979, pp. 612-613.
Waldvogel et al., "The VersaKey Framework: Versatile Group Key Management," IEEE Journal on Selected Areas in Communications, vol. 17, No. 9, Sep. 1999, pp. 1614-1631.
Rafaeli et al., "A Survey of Key Management for Secure Group Communication," ACM Computing Surveys, vol. 35, No. 3, Sep. 2003, pp. 309-329.
Bansal, "Securing Content in Peer-to-Peer File Systems," E&CE 628, Apr. 26, 2003, 54 pp.
Castro et al., "Secure Routing for Structured Peer-to-Peer Overlay Networks," in proceedings of 5$^{th}$ Usenix Symposium on Operating Systems Design and Implementation, 2002, pp. 299-314.
Ajmani et al., "ConChord: Cooperative SDSI Certificate Storage and Name Resolution," In Proceedings of 1$^{st}$ International Workshop on Peer-to-Peer Systems (IPTPS '02), 2002, pp. 141-154.
Stoica et al., "Chord: A Scalable Peer-to-Peer Lookup Service for Internet Applications," Proceedings of ACM SIGCOMM, 2001, vol. 31 (4), pp. 149-160.
Rowstron et al., "Pastry: Scalable, Decentralized Object Location, and Routing for Large-Scale Peer-to-Peer Systems," Proceedings of 18$^{th}$ IFIP/ACM International Conference on Distributed Systems Platforms (Middleware 2001), 2001, 22 pp.
Rabin, "Efficient Dispersal of Information Security, Load Balancing, and Fault Tolerance," Journal of the Association for Computing Machinery, New York, NY, 1989, vol. 36, No. 2, pp. 335-348.
Rowstron et al., "Storage Management and Caching in PAST, A Large-scale, Persistent Peer-to-Peer Storage Utility," Proceedings of ACM SOSP, 2001, vol. 35 (5), 13 pp.
Blaze et al., "Decentralized Trust Management," Proceedings of IEEE Symposium on Security and Privacy, 1996, pp. 164-173.
Muthitacharoen et al., "Ivy: A Read/Write Peer-to-Peer File System," Proceedings of 5$^{th}$ Symposium on Operation Systems Design and Implementation, 2002, vol. 36 (sI), pp. 31-44.
Mahajan et al., "Controlling the cost of Reliability in Peer-to-Peer Overlays," Proceedings of the 2$^{nd}$ International Workshop on Peer-to-Peer Systems, (IPTPs '03), Berkley, CA, 2003, 6 pp.
Castro et al., "One Ring to Rule them All: Service Discovery and Binding in Structured Peer-to-Peer Overlay Networks," Proceedings of the SIGOPS European Workshop, Saint-Emilion, France, 2002, 6 pp.
Castro et al., "Proximity Neighbor Selection in Tree-Based Structured Peer-to-Peer Overlays," Technical Report MSR-TR-2003-52,www.research.microsoft.com, Sep. 2003, 12 pp.
Castro et al., "Topology-aware routing in structured peer-to-peer Overlay Networks," Proceedings for the SIGOPS European Workshop, Saint-Emilion, France, 2002, 5 pp.
Adya et al., "FARSITE: Federated, Available, and Reliable Storage for an Incompletely Trusted Environment," 5$^{th}$ OSDI, Dec. 2002, http://citeseer.ist.psu.edu/adya02farsite.html 14 pp.

(56) References Cited

OTHER PUBLICATIONS

Druschel et al., "PAST: A large-scale persistent Peer-to-Peer storage utility," Proc. of HOTOS Conf., Schoss Elmau, Germany, May 2001, 18 pp.
Blakley, "Safegaurding Cryptographic Keys," Proceedings of the National Computer Conference, 1979, pp. 313-317.
Office Action from U.S. Appl. No. 10/957,235, dated Feb. 22, 2007, 14 pp.
Response to Office Action from U.S. Appl. No. 10/957,235, filed May 22, 2007, 8 pp.
Final Office Action from U.S. Appl. No. 10/957,235, dated Aug. 10, 2007, 20 pp.
Response to Final Office Action from U.S. Appl. No. 10/957,235, filed Oct. 10, 2007, 15 pp.
Advisory Action from U.S. Appl. No. 10/957,235, dated Dec. 31, 2007, 3 pp.
Office Action from U.S. Appl. No. 10/957,235, filed Jun. 10, 2008, 25 pp.
Response to Office Action from U.S. Appl. No. 10/957,235, filed Sep. 10, 2008, 14 pp.
Final Office Action from U.S. Appl. No. 10/957,235, dated Dec. 16, 2008, 33 pp.
Response to Final Office Action from U.S. Appl. No. 10/957,235, filed Feb. 17, 2009, 16 pp.
Advisory Action from U.S. Appl. No. 10/957,235, dated Mar. 5, 2009, 3 pp.
Office Action from U.S. Appl. No. 10/957,235, filed May 28, 2009, 29 pp.
Response to Office Action from U.S. Appl. No. 10/957,235, filed Aug. 28, 2009, 18 pp.
Final Office Action from U.S. Appl. No. 10/957,235, dated Dec. 9, 2009, 28 pp.
Response to Final Office Action from U.S. Appl. No. 10/957,235, filed Mar. 9, 2010, 19 pp.
Office Action from U.S. Appl. No. 10/957,235, dated Apr. 23, 2010, 32 pp.
Response to Office Action from U.S. Appl. No. 10/957,235, filed Jul. 23, 2010, 19 pp.
Final Office Action from U.S. Appl. No. 10/957,235, dated Oct. 14, 2010, 38 pp.
Response to Final Office Action from U.S. Appl. No. 10/957,235, filed Jan. 14, 2011, 22 pp.
Notice of Allowance from U.S. Appl. No. 10/957,235, dated May 2, 2011, 9 pp.
"Peer Integrity Checking System (PICS), Monthly Status Report," DHS Science and Technology Directorate, Nov. 24, 2010, 7 pp.
"Peer Integrity Checking System (PICS), Monthly Status Report," DHS Science and Technology Directorate, Dec. 20, 2010, 8 pp.
"Peer Integrity Checking System (PICS), Monthly Status Report," DHS Science and Technology Directorate, Jan. 20, 2011, 8 pp.
"Peer Integrity Checking System (PICS), Monthly Status Report," DHS Science and Technology Directorate, Feb. 21, 2011, 7 pp.
"Peer Integrity Checking System (PICS), Monthly Status Report," DHS Science and Technology Directorate, Mar. 21, 2011, 8 pp.

\* cited by examiner

PEER INTEGRITY CHECKING SYSTEM

PRIORITY CLAIM

This application claims the benefit of U.S. Provisional Application No. 61/481,586, filed May 2, 2011, the entire content of which is incorporated herein by reference.

TECHNICAL FIELD

The invention relates to file integrity checking and host-based intrusion detection.

BACKGROUND

Modern computer networks are vulnerable to an ever widening variety of attacks and exploits. These attacks degrade the performance of individual hosts and of the network as a whole. They lead directly to the loss of critical data, privacy and, of course, money. A key characteristic of these attacks is the installation of unwanted programs/code into the host nodes that comprise the network. Backdoors, trojans, root-kits, and other types of malicious programs are injected into the networked computers unbeknownst to system users, admins, and owners. This injected malware then does the bidding of unknown masters elsewhere on the network.

Host-based file integrity checkers are sometimes used to detect intrusive attacks that may have compromised critical operating system files. Conventional host-based integrity checkers utilize a database of critical properties for key system files. During this process, the host computer applies this set of stored file signatures to detect whether the critical files of the operating system have been compromised. The file signatures which are used in the integrity checking process for the host computer are typically stored on the host system, or in a database stored on one other computer, and the system checking processes for a given host computer are run on that host computer. Storage of the signature data on the host itself (or a single other computer) renders the integrity checkers vulnerable to compromise. That is, an intrusive or malware program on that host can alter the signatures to prevent detection and conceal its intrusion. In addition, malware, once installed on the host, can prevent or otherwise disrupt the integrity checking processes which are run on that host.

SUMMARY

In general, a distributed file integrity checking system is described. The described peer integrity checking system (PICS) may negate an attack by storing a properties database amongst nodes of a peer-to-peer network of hosts, some or all of which co-operate to protect and watch over each other. The described peer integrity checking system enables the use of Peer-to-Peer technology as a means of network self-defense: the network itself will sense and react to intrusive attacks in a distributed and fault-tolerant manner. Co-operative software processes may be deployed on the nodes that automatically examine the distributed database stored within the peer-to-peer network and detect suspicious or obviously compromised nodes without human intervention, alerting other nodes, users, and network owners/operators to their presence. In one embodiment, a peer integrity checking software package can be installed on thousands of network-connected hosts (e.g., Internet hosts), allowing for cooperative, fault-tolerant intrusion detection and network defense.

In one example, the techniques use a peer-to-peer networking construct called a distributed hash table (DHT) to store the file signature data for individual hosts throughout the peer-to-peer network. As a result, there is no single point of compromise of this database, since it is stored in a "scattered" fashion across potentially hundreds or even thousands of peer computers. This group of peer nodes cooperates so that nodes protect each other. The distributed nature of the file signature storage also allows for one node to explicitly check on the integrity of other nodes, or to "mine" the distributed database of signatures for all nodes for patterns of intrusion.

The techniques described herein use peer-to-peer networking techniques to check the integrity of files stored on a host computer against a database of file "signatures" produced at a prior time and presumed to represent a "good" system state. The comparison detects file system changes associated with unwanted, intrusive programs such as malware.

The distributed nature of the system contrasts with the centralized nature of previous systems. The techniques may utilize functions as a kind of "neighborhood watch" in which peer groups of computers cooperate to ensure each others integrity. As a result, likelihood of a successful intrusive malware attack can be substantially reduced since in order for such an attack to go undetected, many more than just a single host within the peer group must be compromised.

The techniques apply peer-to-peer networking technology to file integrity checking and host-based intrusion detection.

The techniques described herein may be applied to software intrusion detection, anti-virus software products or virtually any software product that seeks to protect a host or an enterprise from the installation of malware by either internal or external means.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
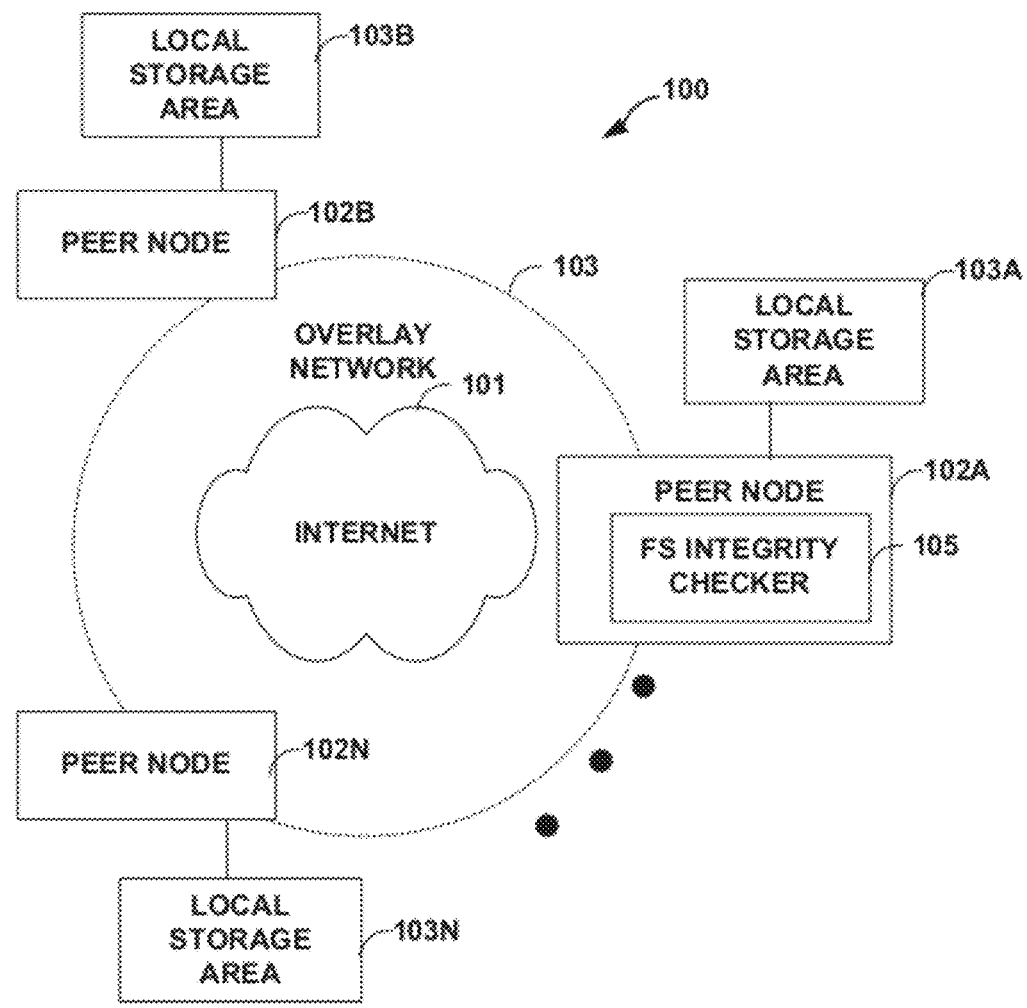
FIG. 1 is a block diagram illustrating an example peer-to-peer (P2P) integrity checking system according to the present invention.

FIG. 1 is a block diagram illustrating an example system that utilizes a distributed file integrity checking system according to the present invention. As shown in the example of FIG. 1, a plurality of peer nodes 102A-102N (collectively, "peer nodes 102") are connected to a common communications network 101 to create a peer-to-peer (P2P) overlay network 103.

P2P overlay network 103 operates within a distributed computing system connected via communications network, such as public Internet 101. For example, network 101 may consist of an Internet Protocol (IP)-based network in which peer nodes 102 exchange data packets or cells using any number of communications protocols, including the transmission control protocol (TCP) or other protocols. Peer nodes 102 maintain P2P tables that include network addresses, such as IP addresses, for other peer nodes 102 for use in the exchange of communications between the various peer nodes.

Each peer nodes 102 provides corresponding local storage areas 103A, 103B and 103N. In general, local storage areas 103 store data objects that may be accessed by software processes executing within any of peer nodes 102. The software processes may be controlled and initiated by principals, i.e., users, who use P2P data storage system 100 to perform data processing tasks. In particular, access requests on behalf of the principals are transmitted between peer nodes 102 to store, retrieve and delete data objects stored within local storage areas 103. Each of the peer nodes 102 applies policies to control the application of the access requests, i.e., whether to accept or reject the access requests. This process may be performed in a secure manner without use of a centralized network node that maintains control access information. Further example details of a secure peer-to-peer network may be found in U.S. patent application Ser. No. 10/957,235, entitled "PEER-TO-PEER OBJECT STORAGE SYSTEM," filed Oct. 1, 2004, and U.S. Provisional Patent Application 60/564,057, entitled "SECURE ACCESS CONTROL IN A PEER-TO-PEER OBJECT STORAGE SYSTEM USING UNTRUSTED COMPONENTS," filed Apr. 21, 2004, the entire contents of both being incorporated herein by reference.

In this way, peer nodes 102 form a P2P data storage system to provide secure object storage for distributed data objects. That is, peer nodes 102 provide insert, lookup, and reclaim capability on individual objects as mechanisms for location and retrieval of information stored within the data objects. For example, objects may consist of metadata and payload, and peer nodes 102 supports query mechanisms to locate objects using the stored metadata.

In accordance with the principles described herein, one or more of peer nodes 102 implements a file integrity checking system 105 that maintains a database of file properties (i.e., signatures) for non-compromised operating system files. For example, file integrity checking system 105 utilizes the database to detect whether a system file of an operating system has been compromised on one or more of peer nodes 102. That is, file integrity checking system 105 checks the integrity of key operating system files stored on itself or one or more other peer nodes 102 against the database of file "signatures" produced at a prior time and that represent a "good" system state. The comparison detects file changes associated with unwanted, intrusive programs such as malware.

Moreover, the file integrity checking system distributes the portions of the database amongst peer nodes 102. More specifically, file integrity checking system 105 uses a distributed hash table (DHT) to store the file signature data for individual hosts throughout the peer-to-peer network as a distributed database. The DHT provides a distributed lookup service, including a Put(Key, Value) in which the arbitrary data Value is stored in the DHT with the given retrieval Key and Value=Get(Key) in which a previously stored Value with the given Key is retrieved from the DHT, if it exists. The distributed store may compute a hash for the key (for example, using SHA-1). The key might be an identifier associated with the data and is hashed into an address space (e.g., 160 bits) provided by the DHT.

This hash key is used to select a node in the network where the Key/Value-tuple is to reside. The P2P overlay network 103 directs the requested Get/Put operation to a node 102 in the overlay network selected by this hash key. The target node may be selected, for example, as the node whose address in the overlay network is the nearest one greater than or equal to the computed hash key. Various data replication strategies may be used to ensure that Key/Value pairs are stored persistently even as nodes dynamically join and leave the P2P overlay network. In this way, the file properties database will be stored not as a single file on the host it protects but scattered throughout P2P network 103 in a distributed store.

In some cases, multiple redundant checks may be performed on an OS file system file using a set of different content-hash functions, i.e., hashes on the content of the data (i.e., the file property) rather than the key value. The different content-hashes may be used as storage keys that take advantage of natural data redundancy in the integrity checking process to distribute file-property data across P2P network 103. These hashes of the contents of the database are distinct from the DHT hash used to select a storage node within the DHT. That is, these file property content-hashes may effectively be "re-hashed" into a keyspace of the DHT by Get/Put operations. This type of application-level data redundancy may be a potential defense against "malicious" nodes which surreptitiously join a P2P DHT's. Since the data itself is replicated under different keys, no single host compromise can subvert all copies of the data. Thus each distinct hashing function used by the integrity checker provides an extra level of redundancy/data replication and resistance to attack.

Figure 2:
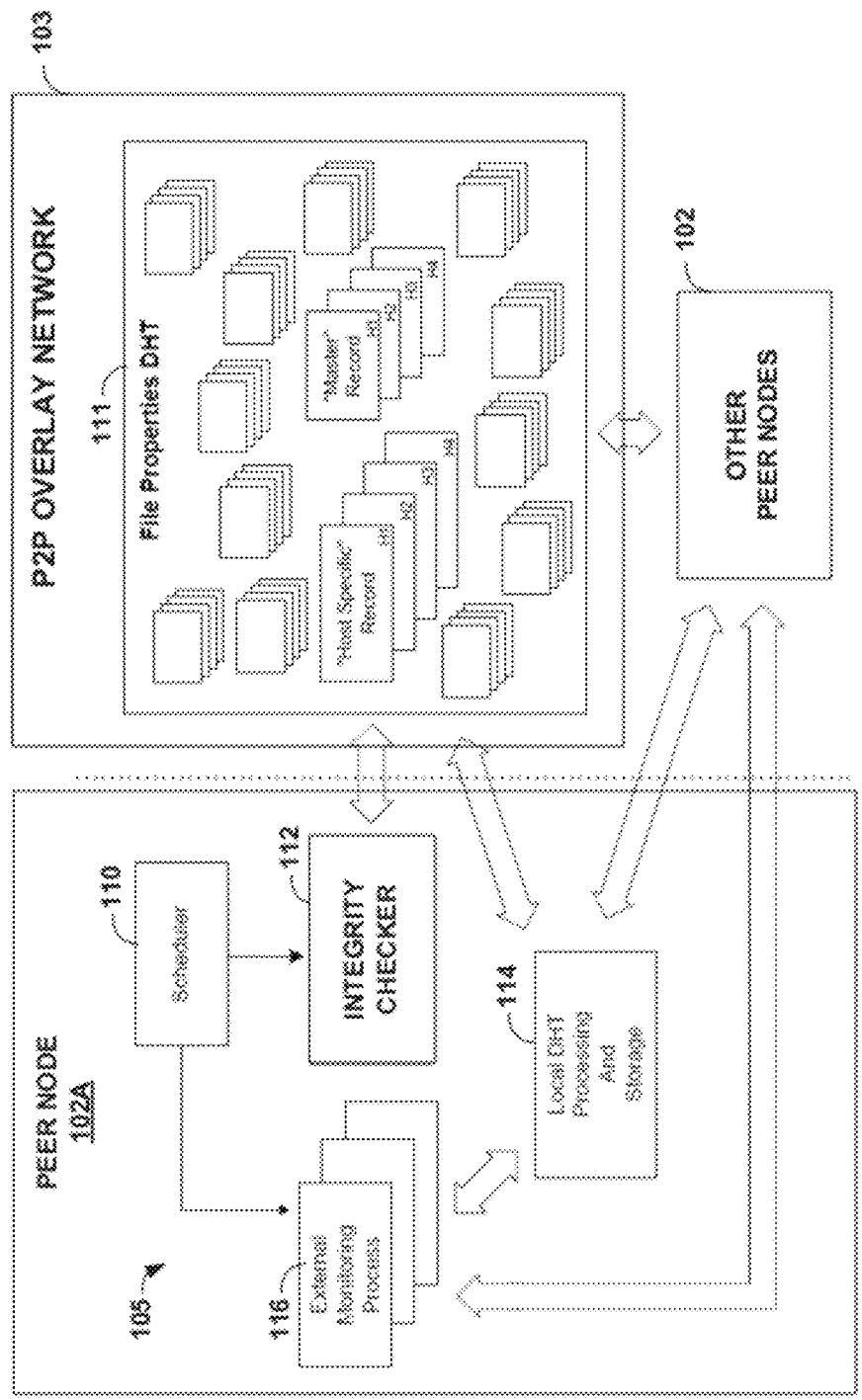
FIG. 2 is block diagram illustrating an exemplary embodiment of a peer node within the P2P integrity checking system of FIG. 1.

FIG. 2 is a block diagram illustrating an example embodiment of file integrity checking system 105 executing on peer node 102A.

Integrity checker 112 uses a list of system files that have been identified for inclusion in the system "snapshot" and are known to be in a valid, non-compromised state. Integrity checker 112 uses the files to generate valid file properties database 111 that is stored in a distributed fashion within P2P overlay network 103. Different descriptions of specific OS system files which are deemed "critical" files and to be checked on different peer node 102 can be defined. These descriptions can typically define different sets of tests to be used for different types of files for different operating systems or different implementations or different levels of integrity verification. Typically, key system executable files and kernel modules are not allowed to change without integrity checker 112 generating an alert notification and/or initiating automated counter-measures. Often, for these files, no changes at all (timestamp, access properties, content-hash) may be allowed. On the other hand, system log files change all the time on a running system and a different set of checks may be appropriate for them. Directory files may be another type that can be handled differently, such as whether all file property data is stored in the DHT or only selected sets or types of files. Various factors may be considered when specifying the files, including system and network loading and performance as well as inherent security requirements. Individual hosts (e.g., different peer nodes 102) may designate and create host-specific entries within DHT 111, e.g., by way of inclusion of a unique host-id in content-hash functions applied to the file properties. Moreover, the individual hosts may update their specific properties database stored within the DHT of overlay network 103 when valid changes (e.g., updates) are made to the system files. As such, the system file properties may be exposed to the other integrity checkers on other peer nodes 102.

Many files on a host which will be subject to integrity checks are configuration- or host-specific data files which will have different content hashes compared to the same files on other similar peer nodes 102. These files would have different content-hashes and automatically be stored at different nodes of the DHT 111. For many hosts using "standard" OS and application distributions (e.g., Windows or a particular Linux flavor) the basic content-hash for a large number of system executable files may be identical no matter which peer node 102 having that OS distribution computes the hash. The addition of some host-unique identifier to the content-hash may be used in some cases to allow each peer node 102 to specifically protect its version of these files.

Master records H1-H4 may be used for different types of hosts to detect system updates, patches, or upgrades and avoid any "false alarms" that may otherwise be generated. For systems using "standard" distributions there may be benefit in storing "master" or "distribution-wide" type property entries (e.g., master records H1-H4) within DHT 111 in order to automatically detect and react to this situation. Thus, when a peer node 102 updates from version i of a particular system executable to version i+1, integrity checker 112 can consult a "master" property and lessen the severity-level of any generated alert by confirming that the new file is a valid part of the distribution and not a maliciously modified copy. The ability to add "master" property records H1-H4 to DHT 111 may be restricted to particular privileged users or be linked with some type of voting or confidence check. For example, the more nodes 102 that update to version i+1 and verify against its "master" record H1-H4 in DHT 111, the less weight given to alerts associated with this particular file change.

DHT module 114 presents an interface for DHT processing (e.g., get and put operations) and storage of data within overlay network 103. Individual entries within valid file properties database 111 store properties of critical system files and are associated with corresponding key/value pairs stored within P2P overlay network 103. Each database key/value pair encapsulates a valid state of one or more system files on a target host system, which may be any of peer nodes 102. Property values may be keyed by multiple content-hashes to provide data redundancy and insure physical distribution across nodes 102 of the PICS network.

External monitoring processes 116 include processes to support challenge/response operations on nodes 102. External monitoring processes 116 may compare system file properties reported by a peer node 102 against its own distributed database or against master data records stored within the DHT for the particular type of host responding to the challenge. In addition, external monitoring processes 116 age records from DHT 111 as appropriate and support logging and alerting operations. Auxiliary databases may be used to support logging, alerting, and the operation of external monitoring processes 116.

Scheduler 110 periodically invokes and executes integrity checker process 112, which consult both "host-specific" data records and "master" data records in the file properties stored within DHT 111 that is maintained across the overlay network 103. Similarly, a variety of scheduled processes may be configured to run on any individual peer node 102 to perform monitoring tasks related to other peer nodes 102 or the overlay network 103 as a whole. These might include ageing records out of the locally maintained portion of the DHT or challenging other peer nodes 102 to verify property records in the local DHT.

The introduction of cooperating P2P nodes 102 into the file integrity checking process gives rise to an array of external processes and procedures 116 which can increase the security of the entire system and automate network protection. The techniques allow peer nodes 102 to perform a kind of "neighborhood watch" in which peer groups of computers cooperate to ensure each others integrity. As a result, likelihood of a successful intrusive malware attack can be substantially reduced since such an attack would have to go undetected, many more than just a single host within the peer group must be compromised.

For example, one attack scenario against a host-based integrity checker is to simply stop running the scheduled checking process. In the P2P system described herein, challenge/response features can be incorporated such that a process running on one peer node 102 requests that a particular file or set of files be checked on another host. Failure to perform the requested check or providing incorrect results may result in counter-measures to deal with a possible intrusion, such as limiting the ability of the peer node to write to the P2P overlay network 103.

External monitoring processes 116 may also perform a set of system-wide integrity checks and maintenance processes. For example, peer nodes 102 which fail or are permanently removed from P2P overlay network 103 may need to have their property records aged out from DHT 111. This is also potentially a condition to be alerted however, in that a potential attack against integrity checking is simply to stop running the checker and thus stop updating the properties database.

Another form of system-wide check might involve "master" or "distribution-wide" file property records described above. Suppose a file is entered into the DHT and marked as "distribution-wide" (lessening the severity of alarms associated with it) but then a very small number of nodes actually upgrade to this new file signature over time. This might signal a potential compromise of the "master" file property facility and give rise to alerts.

As previously discussed, a potential attack against file integrity checkers is to modify log files or block alerts and counter-measures associated with detected system changes. Again, the addition of multiple cooperating peer nodes 102 can help mitigate against the effectiveness of this type of attack. A challenge/response process can be employed to ensure that a local host is actually capable of producing an alert log entry or email. Information about the recipient of emails and alerts for a particular peer node 102 can be stored redundantly on multiple other peer nodes 102 within DHT 111, thus preventing an attacker on a single node from changing email and alert options. Logging of system operation and alerts generated for each host can be maintained in DHT 111 as well, allowing external monitoring processes 116 to verify continuing and correct handling of alerts and emails.

In addition, "system-wide" alerts related to potential system-wide problems may be utilized. These alerts may be handled via entries in DHT 111 which are periodically polled by nodes 102 to increase scalability and avoid the potential for network flooding.

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored on or transmitted over as one or more instructions or code on a tangible computer-readable storage medium. By way of example, and not limitation, such computer-readable storage media can comprise RAM, ROM, EEPROM, CD-ROM or other optical disk storage, magnetic disk storage or other magnetic storage devices, or any other storage medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

Figure 3:
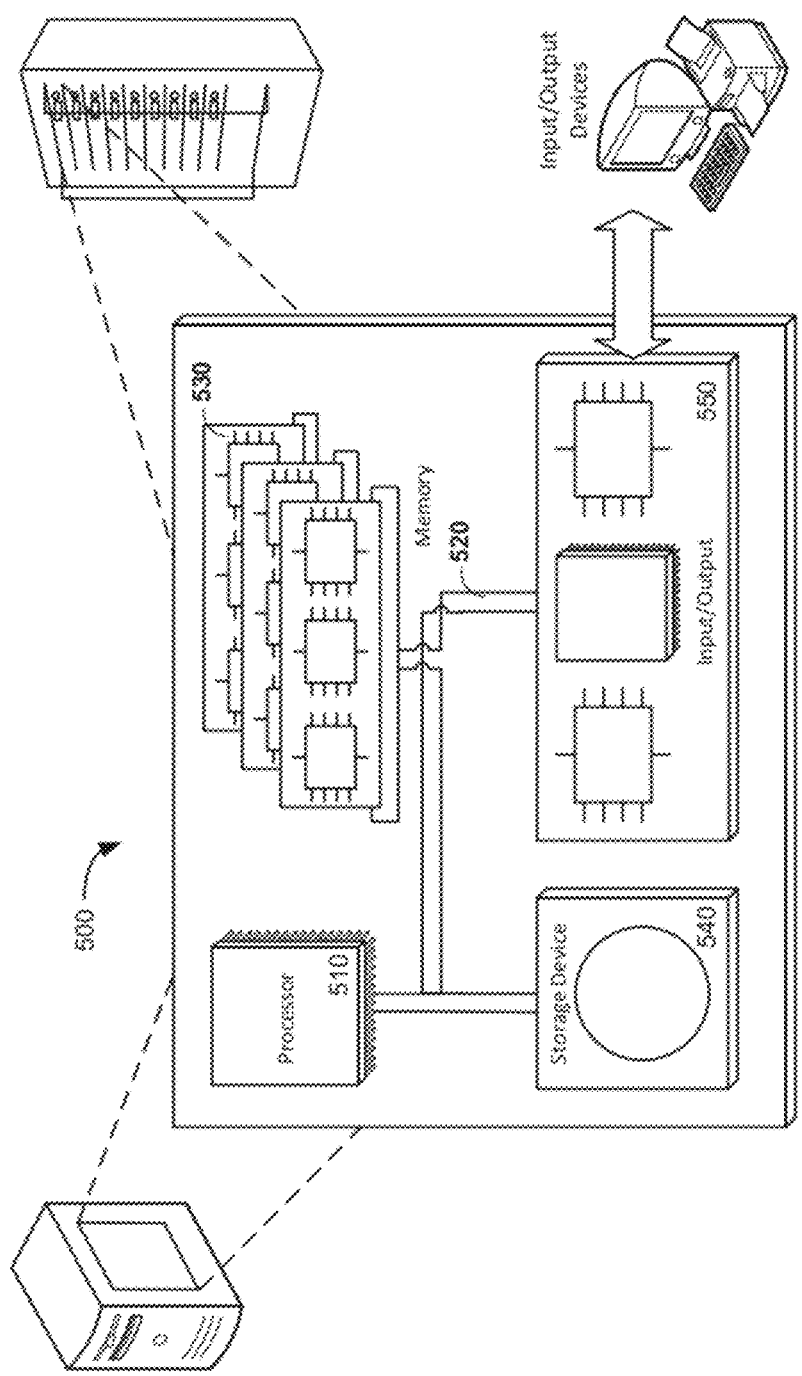
FIG. 3 is block diagram illustrating an exemplary embodiment of a computing device that may be configured to operate as a peer node within the P2P integrity checking system.

FIG. 3 shows a detailed example of various devices that may be configured to execute program code to operate as a peer node within the P2P integrity checking system. Here, a computer 500 includes a processor 510 that is operable to execute program instructions or software, causing the computer to perform various methods or tasks. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server as shown in FIG. 3, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

The computer-readable storage media comprises non-transitory media, where the term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Although specific embodiments have been illustrated and described herein, it will be appreciated by those of ordinary skill in the art that any arrangement that achieves the same purpose, structure, or function may be substituted for the specific embodiments shown. This application is intended to cover any adaptations or variations of the embodiments described herein. It is intended that this disclosure be limited only by the claims, and the full scope of equivalents thereof.

The invention claimed is:

1. A method comprising:
generating a database that contains file properties for a set of valid system files for a non-compromised operating system of a host computer;
storing the database in a distributed manner throughout a peer-to-peer (P2P) network of nodes using a distributed hash table to select the nodes of the P2P network such that the file properties contained within the database are stored to different ones of the nodes of the P2P network, wherein storing the database further comprises:
performing a plurality of different content-hash functions on each of the file properties of the system files to produce a plurality of hash values for each of the file properties;
re-hashing each of the plurality of hash values with a hash function associated with the distributed hash table to generate respective keys that map each of the plurality of hash values for each of the file properties into a key space of the distributed hash table; and selecting nodes of the P2P network as storage nodes to store the plurality of hash values for each of the file properties based on the generated keys; and performing, by a first node of the P2P network, an integrity check of a second node of the P2P network using the distributed hash table to access the file properties contained within the database distributed throughout the P2P network to detect whether a system file of an operating system currently executing on the second node of the P2P network has been compromised by comparing, with the first node, file properties of the system file of the operating system currently executing on the second node of the P2P network with the file properties contained within the database distributed throughout the P2P network.

2. The method of claim 1, wherein performing the integrity check comprises:

outputting a challenge from the first node of the P2P network to the second node of the P2P network requesting that the second node perform an integrity check on system files for an operating system currently executing on the second node;

accessing, with the first node and using the distributed hash table, the database distributed throughout the P2P network to retrieve file properties from the database;

comparing, by the first node, file properties of the system files of the operating system currently executing on the second node reported by the second node as a result from the integrity check to the file properties retrieved from the database distributed throughout the P2P network; and determining that the system files for the operating system currently executing on the second node have been compromised and initiating a counter-measure when one or more of the file properties reported by the second node does not match the file properties retrieved from the database.

3. The method of claim 1, further comprising using the distributed hash table to store a plurality of databases to the P2P network, wherein each of the databases contains master records of properties of system files for different types of hosts computing devices, and wherein the respective file properties contained within the databases are stored to different ones of the nodes of the P2P network in accordance with the distributed hash table.

4. The method of claim 3, wherein the master records contained within the databases stored to the P2P network contain master records for different versions of the same system file, the method further comprising detecting a system update, patch, or upgrade as part of a valid distribution to one of the nodes of the P2P network by accessing the database storing the master records for the one of the nodes of the P2P network, and reducing a severity-level of a corresponding alert upon confirming that a new or changed file on the one of the nodes of the P2P network is a valid part of the distribution.

5. A system comprising:

a communications network;

a plurality of peer nodes coupled by the communications network to form a peer-to-peer overlay network, wherein each of the peer nodes includes a local storage area, and wherein a first node of the P2P network comprises:

a microprocessor;

a distributed hash table service that applies a distributed hash table to provide a lookup service to identify locations for objects within the local storage areas of the peer nodes; and an integrity checker software executing on the microprocessor that generates a database that contains file properties for a set of valid system files for a non-compromised operating system of a host computer and stores entries of the database to the local storage area of the peer nodes in a distributed manner using the distributed hash table service such that the file properties contained within the database are stored to different ones of the nodes of the P2P network, wherein the integrity checker software performs an integrity check of a second node of the P2P network using the distributed hash table to access the file properties contained within the database distributed throughout the P2P network to detect whether a system file of an operating system currently executing on the second node of the P2P network has been compromised by comparing, with the first node, file properties of the system file of the operating system currently executing on the second node of the P2P network with the file properties contained within the database distributed throughout the P2P network, wherein the integrity checker software generates the database by performing a plurality of different content-hash functions on each of the properties of the database to produce a plurality of hash values for each of the properties, wherein the distributed hash table service further re-hashes each of the plurality of hash values with a hash function associated with the distributed hash table to generate respective keys that maps each of the plurality of hash values for each of the properties into a key space of the distributed hash table and selects peer nodes as storage nodes to store the plurality of hash values of each of the file properties based on the generated keys.

6. The system of claim 5, further comprising a scheduler that periodically invokes integrity checker software to perform an integrity check using the distributed hash table.

7. The system of claim 5, wherein the set of valid system files is associated with a different one of the peer nodes than the first node on which the integrity checker software executes.

8. The system of claim 5, further comprising a monitoring process that outputs a challenge from the first node to the second node of the peer nodes requesting that the second node performs an integrity check on system files for an operating system currently executing on the second one of the P2P nodes, wherein the monitoring process is configured to access, with the first node and using the distributed hash table, the database distributed throughout the P2P network to retrieve file properties from the database and compare file properties of the system file of the operating system currently executing on the second node reported by the second node as a result from the integrity check to the file properties retrieved from the database distributed throughout the P2P network, and wherein the monitoring process is configured to initiate a counter-measure when one or more of the file properties reported by the second node does not match the file properties retrieved from the database.

9. A non-transitory computer-readable storage medium comprising instructions that cause a processor to:

generate a database that contains file properties for a set of valid system files for a non-compromised operating system of a host computer;
store the database to in a distributed manner throughout a peer-to-peer (P2P) network of nodes using a distributed hash table to select the nodes of the P2P network such that the file properties contained within the database are stored to different ones of the nodes of the P2P network, wherein storing the database further comprises:
 performing a plurality of different content-hash functions on each of the file properties of the system files to produce a plurality of hash values for each of the file properties;
 re-hashing each of the plurality of hash values with a hash function associated with the distributed hash table to generate respective keys that map each of the plurality of hash values for each of the file properties into a key space of the distributed hash table; and
 selecting nodes of the P2P network as storage nodes to store the plurality of hash values for each of the file properties based on the generated keys; and
perform, with a first node of the P2P network, an integrity check of a second node of the P2P network using the distributed hash table to access the file properties contained within the database distributed throughout the P2P network to detect whether a system file of an operating system currently executing on the second node of the P2P network has been compromised by comparing, with the first node, file properties of the system file of the operating system currently executing on the second node of the P2P network with the file properties contained within the database distributed throughout the P2P network.

10. A method comprising:
generating a database that contains file properties for a set of valid system files for a non-compromised operating system of a host computer;
storing the database in a distributed manner throughout a peer-to-peer (P2P) network of nodes using a distributed hash table to select the nodes of the P2P network such that the file properties contained within the database are stored to different ones of the nodes of the P2P network; and
performing, by a first node of the P2P network, an integrity check of a second node of the P2P network using the distributed hash table to access the file properties contained within the database distributed throughout the P2P network to detect whether a system file of an operating system currently executing on the second node of the P2P network has been compromised by comparing, with the first node, file properties of the system file of the operating system currently executing on the second node of the P2P network with the file properties contained within the database distributed throughout the P2P network, wherein performing the integrity check comprises:
 outputting a challenge from the first node of the P2P network to the second node of the P2P network requesting that the second node perform an integrity check on system files for an operating system currently executing on the second node;
 accessing, with the first node and using the distributed hash table, the database distributed throughout the P2P network to retrieve file properties from the database;
 comparing, by the first node, file properties of the system files of the operating system currently executing on the second node reported by the second node as a result from the integrity check to the file properties retrieved from the database distributed throughout the P2P network; and
 determining that the system files for the operating system currently executing on the second node have been compromised and initiating a counter-measure when one or more of the file properties reported by the second node does not match the file properties retrieved from the database.

11. A system comprising:
a communications network;
a plurality of peer nodes coupled by the communications network to form a peer-to-peer overlay network, wherein each of the peer nodes includes a local storage area, and
wherein a first node of the P2P network comprises:
 a microprocessor;
 a distributed hash table service that applies a distributed hash table to provide a lookup service to identify locations for objects within the local storage areas of the peer nodes;
 an integrity checker software executing on the microprocessor that generates a database that contains file properties for a set of valid system files for a non-compromised operating system of a host computer and stores entries of the database to the local storage area of the peer nodes in a distributed manner using the distributed hash table service such that the file properties contained within the database are stored to different ones of the nodes of the P2P network,
 wherein the integrity checker software performs an integrity check of a second node of the P2P network using the distributed hash table to access the file properties contained within the database distributed throughout the P2P network to detect whether a system file of an operating system currently executing on the second node of the P2P network has been compromised by comparing, with the first node, file properties of the system file of the operating system currently executing on the second node of the P2P network with the file properties contained within the database distributed throughout the P2P network, wherein the integrity checker software performs the integrity check comprises:
  outputting a challenge from the first node of the P2P network to the second node of the P2P network requesting that the second node perform an integrity check on system files for an operating system currently executing on the second node;
  accessing, with the first node and using the distributed hash table, the database distributed throughout the P2P network to retrieve file properties from the database;
  comparing, by the first node, file properties of the system files of the operating system currently executing on the second node reported by the second node as a result from the integrity check to the file properties retrieved from the database distributed throughout the P2P network; and
  determining that the system files for the operating system currently executing on the second node have been compromised and initiating a counter-measure when one or more of the file properties reported by the second node does not match the file properties retrieved from the database.

12. A method comprising:
generating a database that contains file properties for a set of valid system files for a non-compromised operating system of a host computer;
storing the database in a distributed manner throughout a peer-to-peer (P2P) network of nodes using a distributed hash table to select the nodes of the P2P network such that the file properties contained within the database are stored to different ones of the nodes of the P2P network;
using the distributed hash table to store a plurality of databases to the P2P network, wherein each of the databases contains master records of properties of system files for different types of hosts computing devices, wherein the respective file properties contained within the databases are stored to different ones of the nodes of the P2P network in accordance with the distributed hash table, and wherein the master records contained within the databases stored to the P2P network contain master records for different versions of the same system file;
performing, by a first node of the P2P network, an integrity check of a second node of the P2P network using the distributed hash table to access the file properties contained within the database distributed throughout the P2P network to detect whether a system file of an operating system currently executing on the second node of the P2P network has been compromised by comparing, with the first node, file properties of the system file of the operating system currently executing on the second node of the P2P network with the file properties contained within the database distributed throughout the P2P network; and
detecting a system update, patch, or upgrade as part of a valid distribution to one of the nodes of the P2P network by accessing the database storing the master records for the one of the nodes of the P2P network, and reducing a severity-level of a corresponding alert upon confirming that a new or changed file on the one of the nodes of the P2P network is a valid part of the distribution.

13. A system comprising:
a communications network;
a plurality of peer nodes coupled by the communications network to form a peer-to-peer overlay network, wherein each of the peer nodes includes a local storage area, and
wherein a first node of the P2P network comprises:
a microprocessor;
a distributed hash table service that applies a distributed hash table to provide a lookup service to identify locations for objects within the local storage areas of the peer nodes and uses the distributed hash table to store a plurality of databases to the P2P network, wherein each of the databases contains master records of properties of system files for different types of hosts computing devices, wherein the respective file properties contained within the databases are stored to different ones of the nodes of the P2P network in accordance with the distributed hash table, and wherein the master records contained within the databases stored to the P2P network contain master records for different versions of the same system file; and
an integrity checker software executing on the microprocessor that generates a database that contains file properties for a set of valid system files for a non-compromised operating system of a host computer and stores entries of the database to the local storage area of the peer nodes in a distributed manner using the distributed hash table service such that the file properties contained within the database are stored to different ones of the nodes of the P2P network,
wherein the integrity checker software performs an integrity check of a second node of the P2P network using the distributed hash table to access the file properties contained within the database distributed throughout the P2P network to detect whether a system file of an operating system currently executing on the second node of the P2P network has been compromised by comparing, with the first node, file properties of the system file of the operating system currently executing on the second node of the P2P network with the file properties contained within the database distributed throughout the P2P network,
and wherein the integrity checker software detects a system update, patch, or upgrade as part of a valid distribution to one of the nodes of the P2P network by accessing the database storing the master records for the one of the nodes of the P2P network, and reducing a severity-level of a corresponding alert upon confirming that a new or changed file on the one of the nodes of the P2P network is a valid part of the distribution.

* * * * *